July 8, 1969 P. R. VOGT 3,453,827
INJECTION THROTTLING
Filed Nov. 26, 1962

INVENTOR.
PAUL R. VOGT
BY
Donald W. Graves
ATTORNEY

United States Patent Office 3,453,827
Patented July 8, 1969

3,453,827
INJECTION THROTTLING
Paul R. Vogt, Tarzana, Calif., assignor to North American Rockwell Corp., a corporation of Delaware
Filed Nov. 26, 1962, Ser. No. 242,240
Int. Cl. B63h *11/12*
U.S. Cl. 60—204           8 Claims This invention relates to a throttling control for rocket engines and the like.

More particularly, this invention relates to a throttling method and structure whereby a rocket may be throttled from a maximum thrust level to a much lower thrust level.

Accordingly, it is an object of this invention to provide improved throttling for rocket engines and the like.

It is another object of this invention to provide for a throttling method and structure whereby the thrust levels of a rocket engine may be varied widely.

It is a more particular object of this invention to provide for a method and structure of throttling in which during low throttling operation, helium or other inert gas is injected into the oxidizer and the fuel manifolds of the injector to maintain high injection velocities and proper atomization of propellants even at very low flow rates.

Figure 1:
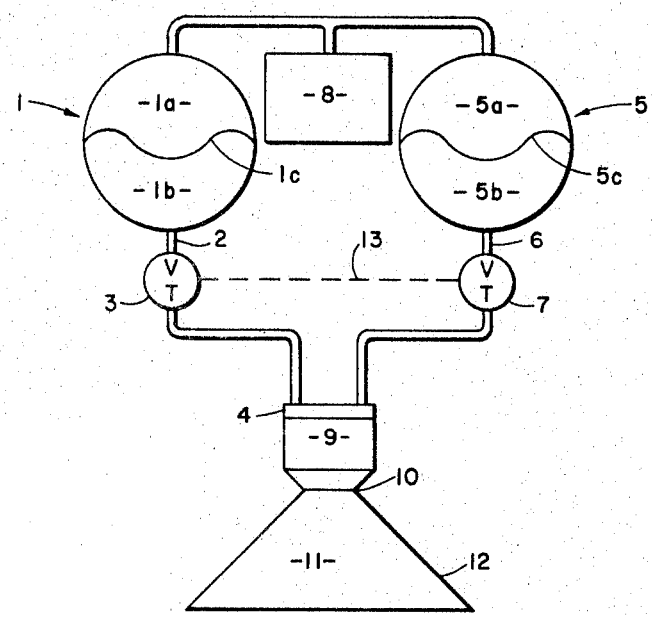
Figure 2:
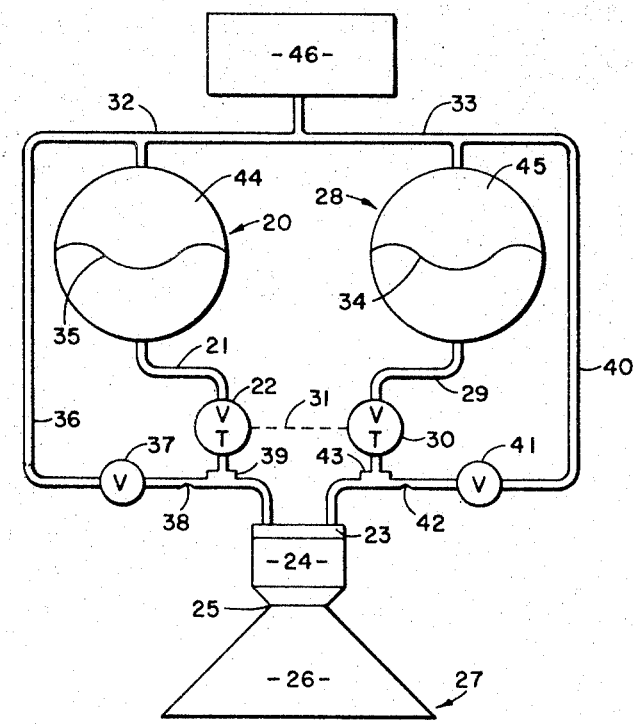

Other and more specific advantages of this invention will become apparent from this description and the accompanying drawings in which:

FIG. 1 is a schematic view of a prior art device, and
FIG. 2 is a schematic view of one embodiment of this invention.

One of the most significant technical problems in the propulsion area is the reliable attainment of low throttle capability in rocket engines and the like. This must be accomplished without requiring excessive propellant supply pressures and without sacrificing full thrust specific impulse.

One of the solutions to this problem is disclosed in U.S. application Ser. No. 166,452 filed on Jan. 10, 1962, now Patent No. 3,234,731, and assigned to the assignee of this invention. In this application is disclosed a method for throttling a rocket engine in which valving is provided adjacent the injector face to vary the injector area whereby the fuel and oxidizer rates of flow are varied. While this is satisfactory in many respects, certain disadvantages are inherent in this type of throtting structure. One disadvantage resides in the application of the injector in large engines. This necessitates a large valving members which, in turn, requires a rather large force for activation. Also, since this type of injection with an annular injection orifice is utilized, complete combustion and mixing of the fuel occurs only in the area of this orifice. This results in areas of the injector remote from the orifice in which fuel and oxidizer are not combusted. This can result in a loss of efficiency and hotspots. Finally, the valving member is a movable part in or adjacent the combustion chamber which in many cases is undesirable due to such factors as high temperatures and pressures encountered in this region.

Other solutions to this problem have been proposed, but for the most part add a great deal of weight which is obviously undesirable or too complex.

FIG. 1 illustrates a prior art device which is conventional in all respects and is illustrated here to show the problems apparent in a conventional system. It should be pointed out that, in the past, the need for throttling was minimal as compared to present and future needs. That is, in most applications of rocket engines, the need for throttling a rocket engine to low thrust levels was not present. However, space travel in the future dictates the need for wide throttling ranges for such purposes as super performance rocket engines and landing and attitude control. Other existing needs for wide throttlings are in aircraft such as the X–15. Reference is also made to the U.S. patent to Aldrich, No. 2,949,007, and assigned to the assignee of this invention as a prior art example.

Referring now to FIG. 1, 1 represents a propellant tank which may contain a fuel such as a 50 percent $N_2H_4$ 50 percent unsymmetrical dimethyl hydrazine. This fuel is pressurized by helium in compartment 1a fed by tank 8, the helium being separated from the fuel compartment 1b by diaphragm 1c. The fuel may be pressurized by another gas, pumps or other conventional means. In any event, the liquid fuel is led from tank 1 into line 2, throttling valve 3 and into injector 4 where it mixes with an oxidizer. Similarly, oxidizer, such as $N_2O_4$, similarly pressurized in tank 5 is led into line 6, throttling valve 7 and injector 4. As in tank 1, the helium in compartment 5a pressurizes the oxidizer in compartment 5b through diaphragm 5c. The fuel and oxidizer is injected in a conventional manner through a plurality of injector nozzles in injector 4 thereby mixing and atomizing the fuel with the oxidizer where the two are combusted in combustion chamber 9. The expanding gases pass through narrow throat area 10 into expansion chamber 11 in nozzle 12 and exhausted at the rear of the vehicle. A conventional link 13 is provided between valves 3 and 7 to insure simultaneous operation when varying throttling ranges.

In injecting the fuel and oxidizer from injector 4 into the chamber 9, a certain pressure is necessary across the injector 4 to intimately mix the fuel and oxidizer. If the throttling valves 3 and 7 are used to close the amount of flow through lines 2 and 6 to the injector, a pressure drop occurs across valves 3 and 7 which is great enough at low thrust ranges to decrease the pressure drop across the fixed area injector 4 to unsatisfactory levels. Accordingly, it can be seen from the laws of liquid flow that in prior art devices such as illustrated in FIG. 1, for low thrust levels, such as below 50 percent, the pressure drop across the injector will be less than 25 percent of the pressure drop at full thrust valve. Thus at low thrust levels, the prior art device does not provide satisfactory mixing of the propellants.

FIG. 2 which is a schematic illustration of this invention discloses a conventional system similar to that shown in FIG. 1 except for certain elements which will become apparent as this description proceeds. Again, fuel is stored in propellant tank 20 and an oxidizer in propellant tank 28. Fuel in line 21 passes through conventional throttling valve 22, conventional injector 23 and into combustion chamber 24 where it mixes and is combusted with the oxidizer from tank 28 with the resultant reactant gases escaping through throat 25 and expansion chamber 26 of nozzle 27 in a conventional maner. Oxidizer reaches the chamber 24 from tank 28 by flow through line 29, throttle valve 30 and injector 23. Again, a link 31 which may be a mechanical linkage is provided to insure simultaneous operation of the throttle valves 22 and 30. Valves 22 and 30 are proportioned according to the mixture of fuel and oxidizer. The fuel and oxidizer are pressurized by providing a pressurized gas in a container such as 46. This gas, helium, for example, is led into lines 32 and 33 into propellant tanks 20 and 28 to pressurize the liquid fuel and oxidizer. For space applications, it is desirable to provide a diaphragm 35 in tank 20 and diaphragm 34 in tank 28 to prevent mixture of the liquid and gas. However, such a diaphragm is not an essential feature of this invention.

To provide for deep throttling ranges, this invention contemplates the use of a line 36, valve 37, orifice 38, fuel manifold 39 and line 40, valve 41, orifice 42 and oxidizer manifold 43. With this arrangement, deep throttling ranges in the neighborhood of 10 to 1 or better are feasible.

The helium injection throttling system operates as follows. In throttling down from 100 percent thrust, the linked valves 22 and 30 act in the normal fashion to throttle the engine. Whenever the control system calls for a predetermined value less than 100 percent thrust level such as 50 percent, the helium valves 37 and 41, which may be solenoid operated, open to admit helium into the injector manifolds. Valves 37 and 41 may be linked with valves 22 and 30 if desired to automatically operate or open at thrust level flow rates below a given minimum such as 50 percent. The helium mixes with the propellants and acts to maintain adequate pressure drops which may be in the neighborhood of from 5 to 10 p.s.i. for stable and efficient combustion throughout the remainder of the throttle range which can extend to about 5 percent of rated thrust or lower. Propellant flows at all times, both with and without helium addition, are basically controlled by the upstream throttle valves 22 and 30 which are proportioned in size to maintain correct mixture ratio throughout their range of travel. The helium does not control the thrust level, but merely acts to maintain suitable injector pressure drop across injector 4 by adding its expansion energy directly to the injection process. This assists in promoting the uniform flow and good atomization of propellants required for stable and efficient combustion.

The helium flow rate required is not critical and is controlled as shown in FIG. 2 by orifices 38 and 42 which proportion helium flow to the fuel and oxidizer sides of the injector in a ratio of the total injector hole areas respectively. Preferably, these orifices are dimensioned so that with a given tank pressure, the velocity of helium through the orifice is sonic. This provides a relatively constant flow rate. A total helium flow of only $2 \times 10^{-6}$ pounds per second is ample for each pound of rated engine thrust. Accordingly, a 10,000 pound rated thrust engine will require approximately .02 pound per second or less of helium flow during a throttling period and 100 seconds of throttling will require a maximum of 2 pounds of helium.

For convenience, the source of helium is shown in FIG. 2 as being drawn from the ullage 44 and 45 of the propellant tanks 20 and 28. Ordinarily, deep throttling of a landing engine, for example, is required only at the end of the flight and because full tank pressure is not required for throttle operation, the helium demand can be met from gas which would otherwise be left useless in an emptied tank. Thus, no additional helium supply is required for this throttling system. The helium flow is not large so tank pressures will not ordinarily be seriously reduced and the engine can be returned to a nearly full thrust condition at any time. However, this helium can be supplied or stored independently of the fuel system.

For a numerical example, assume that at full thrust, chamber pressure in chamber 24 of 100 p.s.i. is used with an injector change of pressure of 30 p.s.i. across injector 23. Assuming a 50 p.s.i. drop for the total feed system upstream of the injector, a tank pressure of 180 p.s.i. will then be obtained. Assuming that the chamber is throttled to 1/10 rated thrust by means of the upstream valves only, it can be seen that that chamber pressure will be approximately 10 p.s.i. (1/10 of the previous 100 p.s.i. pressure), propellant flows will also be 1/10 of this previous value, and injector change in pressure will be approximately 0.3 p.s.i. (pressure drop through injector orifices is proportional to the square of the propellant flow so that 0.3 p.s.i. is calculated by $1/10^2 \times 30$ or 0.3 p.s.i.) leaving a pressure drop across the throttle valves of approximately 169.7 p.s.i. to add up to 180 p.s.i. This injector change in pressure or drop in pressure of 0.3 p.s.i. is unsatisfactory since, as pointed out previously, it is necessary to maintain an injector change in pressure of between 5 and 10 p.s.i. At lower pressure drops, liquid flow through the injector results in a dribble causing erratic burning.

However, utilizing the structure and concept of this invention, if helium is introduced by opening valves 37 and 41 (which may be automatic at a desired thrust level), the injector change in pressure may be raised to 10 p.s.i. with the result that the throttle valve pressure drop across valves 22 and 30 can be adjusted to 160 p.s.i. Thus, it is seen that sufficient injector pressure drop may be readily obtained with the introduction of helium while still vesting control of the engine thrust entirely with the propellant valves. With a relatively constant helium flow, the propellant valves 22 and 30 can be further adjusted to obtain any desired propellant flow rate and consequent level of engine thrust.

While a specific embodiment of this invention has been illustrated, it will become apparent to others skilled in the art that certain modifications can be made without departing from the scope of the disclosure. For example, it is within the scope of this invention to utilize other propellants than those disclosed. An example would be liquid hydrogen and liquid oxygen. In addition, gases other than helium could be utilized if the desirable characteristics in a particular system dictate. While a bi-propellant system is disclosed, it is within the scope of this invention to utilize a structure in a mono-propellant, or, for that matter, a poly-propellant system. In addition, different injector configurations other than cited, for example, can be used. Finally, the configuration of the nozzle could be varied without departing from the scope of this invention.

I claim:

1. A throttling system comprising:
   a combustion chamber,
   means to inject propellant into said combustion chamber,
   means to supply propellant to said injection means under pressure,
   means to vary the rate of flow of said propellant to said injection means, and
   means to supply a fluid inert relative to said propellant under pressure, said fluid adapted to be injected into said propellant downstream of said propellant flow rate varying means,
   whereby said pressurized fluid maintains a predetermined minimum pressure drop across said injection means at low flow rates of propellant.

2. A throttling system according to claim 1 in which said inert fluid under pressure is helium.

3. A throttling system according to claim 1 including means to expand said inert fluid prior to its injection into said propellant whereby the rate of flow of said propellant is substantially independent of the rate of flow of said fluid under pressure.

4. A throttling system according to claim 1 including control means linked to said propellant rate varying means operative to allow flow of said fluid into said injector means when said flow of said propellant to said injector means falls below a predetermined rate.

5. A throttling system according to claim 1 in which said fluid under pressure passes through fixed area orifice means to expand said fluid.

6. A throttling system according to claim 1 and further including
   a second means to supply a second propellant to said injection means under pressure,
   a second means to vary the rate of flow of said second propellant to said injection means and,
   second means to supply a fluid inert relative to said second propellant under pressure adapted to force said second propellant into said injector means downstream of said flow varying means whereby said pressurized fluid maintains a predetermined minimum pressure drop across said injector at low flow rates of said second propellant.

7. A throttling system comprising
   a combustion chamber, means adapted to inject a fuel and an oxidizer into said combustion chamber,
a source of oxidizer,
means to convey oxidizer from said source to said injector means,
means to vary the rate of flow of said oxidizer,
a source of fuel, and
means to convey fuel from said fuel source to said injector means, said injector means adapted to mix said fuel and oxidizer and inject same into said combustion chamber,
means to vary the rate of flow of said fuel,
a source of gas under pressure, said gas being adapted to force said fuel and oxidizer under pressure through said fuel and oxidizer conveying means respectively, and
means to convey gas from said source under pressure to said injection means,
whereby said gas under pressure mixes with said fuel and oxidizer to increase the injection velocities of said fuel and oxidizer.

8. The method of throttling a rocket engine which comprises:
flowing through a feed line, a propellant under pressure from a propellant source,
controlling the rate of flow of said propellant through said line,
providing a source of pressurized inert gas,
expanding said gas,
thereafter introducing said expanded gas into said controlled propellant flow to increase the velocity thereof, and
injecting said gas and said propellant into said rocket engine.

References Cited
UNITED STATES PATENTS

| | | | |
|---|---|---|---|
| 2,835,106 | 5/1958 | Carter | 60—35.6 |
| 2,949,007 | 8/1960 | Aldrich et al. | 60—35.6 |
| 3,045,424 | 7/1962 | Morrell | 60—35.6 |
| 2,995,008 | 8/1961 | Fox | 60—35.6 |
| 3,098,353 | 7/1963 | Abild | 60—35.6 |
| 3,102,388 | 9/1963 | Abild | 60—35.6 |

MARTIN P. SCHWADRON, *Primary Examiner.*

D. HART, *Assistant Examiner.*

U.S. Cl. X.R.

60—39.03, 258